(12) United States Patent
Cai et al.

(10) Patent No.: US 12,141,526 B1
(45) Date of Patent: Nov. 12, 2024

(54) DEEP SEMANTIC FEATURE BASED FEW SHOT INTENT RECOGNITION METHOD FOR AIR TRAFFIC CONTROL INSTRUCTIONS

(71) Applicant: BEIHANG UNIVERSITY, Beijing (CN)

(72) Inventors: Kaiquan Cai, Beijing (CN); Yang Yang, Beijing (CN); Yi Hui, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 18/414,758

(22) Filed: Jan. 17, 2024

(30) Foreign Application Priority Data

Nov. 6, 2023 (CN) .......................... 2023114607663

(51) Int. Cl.
*G06F 40/284* (2020.01)
(52) U.S. Cl.
CPC .................. *G06F 40/284* (2020.01)
(58) Field of Classification Search
CPC .................................. G06F 40/284

USPC ............................................. 704/9
See application file for complete search history.

(56) References Cited

U.S. PATENT DOCUMENTS

2022/0343068 A1* 10/2022 Zhang ................... G06F 40/211

* cited by examiner

*Primary Examiner* — Thierry L Pham
(74) *Attorney, Agent, or Firm* — Jose Cherson Weissbrot

(57) ABSTRACT

The deep semantic feature based few-shot intent recognition method for air traffic control instructions, belonging to the technical field of air traffic control; the method of the present invention solves technical problems in the prior art relating to incomplete and unreliable security situation awareness and semantic representation due to poor intent recognition ability for instructions with a small sample size, as well as difficulty in improving the applicability of models while keeping a small amount of labeled language information; the present invention uses the one obtained air traffic control instruction set to construct a domain language model and adopts an unsupervised learning method to enhance the mining and representation of deep-level features of air traffic control air-ground communication, thereby further improving the reliability of safety situation awareness and semantic representation.

10 Claims, 2 Drawing Sheets

Constructing a fine-tuned BERT language model, a masked language model and a language model based on contrastive learning, and performing a joint pre-training to obtain an overall language model

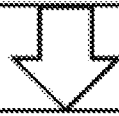

Constructing a classifier, pre-labeling a part of the to-be-predicted area air traffic control instructions, thereby obtaining few shots therefrom;extracting a deep semantic feature representation through the overall language model, inputting the deep semantic feature representation into the classifier, and performing pre-training on the classifier to obtain an intent recognition model;

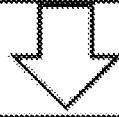

Inputting the to-be-predicted area air traffic control instructions that are not pre-labeled into the overall language model, and extracting a deep semantic feature representation of the corresponding instructions; subsequently, performing intent recognition processing on the deep semantic feature representation of the corresponding instructions by using the intent recognition model to obtain a corresponding prediction result, thereby completing the intent recognition of the to-be-predicted area air traffic control instructions that are not pre-labeled.

Figure 1

DEEP SEMANTIC FEATURE BASED FEW SHOT INTENT RECOGNITION METHOD FOR AIR TRAFFIC CONTROL INSTRUCTIONS

TECHNICAL FIELD

This invention generally relates to the technical field of air traffic control, and more particularly, to a deep semantic feature based few-shot intent recognition method for air traffic control instructions.

BACKGROUND

An air traffic control instruction intent recognition method is a method capable of analyzing and understanding the semantic information of controllers and pilots, and assisting air traffic controllers and pilots to find the wrong intent caused by information omission or misunderstanding in the instruction interaction, thereby realizing a timely pre-warning of unsafe events such that safe and orderly operation of the aircrafts is ensured.

The security monitoring of the air traffic control instructions assisted by the artificial intelligence technology has begun to develop and apply in the air traffic control industry, which mainly comprises two steps: first, using ASR (Automatic Speech Recognition) to automatically recognize the speech signals, and second, using NLU (Natural Language Understanding) to understand the instructions. Intent is a key element for understanding the instructions of both the air-ground parties, which is the most direct mode for perceiving the current situation information of the control airspace and is also an important information source for predicting the future operation state. Real-time and accurate recognition of instruction intents is crucial for completing the entire phase of night missions. With the gradual promotion of artificial intelligence technology in the field of air traffic control, using AI (Artificial Intelligence) to enhance the sensing ability and situation prediction ability of air traffic controllers and pilots has become increasingly important.

Presently, a conventional method is to construct a model for intent prediction by using an instruction set, wherein a fixed model is constructed based on a large number of labeled instructions. However, because the instructions in different scenarios are different, it is difficult to apply a fixed model constructed using only one data set to an entire phase of a light. Meanwhile, due to the uniqueness of civil aviation operation, there are great differences in terms used in different phases and situations. It is often difficult to collect enough data to support the research of air traffic control intent recognition for some intents that are important for adjustment of flight status but not frequently used. For example, an intent for information change, namely, both the controller and pilot may make corrections to wrong instructions due to various factors, and recognition of these changes enables the future status of the flight to be timely adjusted. Therefore, the intent recognition lack of corpus dataset and having fixed information representation faces big challenges in air traffic control.

In conclusion, it is urgent to develop a novel method for solving technical problems in the prior art relating to incomplete and unreliable security situation awareness and semantic representation due to poor intent recognition ability for instructions with a small sample size, as well as difficulty in improving the applicability of models while keeping a small amount of labeled language information.

SUMMARY

The purpose of the present invention is to provide a deep semantic feature based few-shot intent recognition method for air traffic control instructions, which is capable of solving technical problems in the prior art relating to incomplete and unreliable security situation awareness and semantic representation due to poor intent recognition ability for instructions with a small sample size, as well as difficulty in improving the applicability of models while keeping a small amount of labeled information.

To achieve the above purpose, the present invention adopts the following technical solution: a deep semantic feature based few-shot intent recognition method for air traffic control instructions, comprising the steps of: first, obtaining an overall language model and an intent recognition model as follows:

Constructing a fine-tuned BERT language model, a masked language model and a language model based on contrastive learning, and performing a joint pre-training process to obtain an overall language model: constructing a classifier, pre-labeling a part of the to-be-predicted area air traffic control instructions, thereby obtaining small samples therefrom: extracting a deep semantic feature representation through the overall language model, inputting the deep semantic feature representation into the classifier, and training the classifier to obtain an intent recognition model;

Second, using the overall language model to get the deep semantic feature representation of the to-be-predicted area air traffic control instructions that are not pre-labeled and the intent recognition model to recognize the intent;

Inputting the to-be-predicted area air traffic control instructions that are not labeled into the overall language model, and extracting a deep semantic feature representation of the corresponding instructions: subsequently, performing intent recognition processing on the deep semantic feature representation of the corresponding instructions, and using the intent recognition model to obtain a corresponding prediction result, thereby completing the intent recognition of the to-be-predicted area air traffic control instructions.

In another embodiment of the present invention, obtaining the overall language model and the intent recognition model, comprising the steps of:

Step 1: constructing a control area air traffic control instruction set and a to-be-predicted area air traffic control instruction set, wherein the to-be-predicted area air traffic control instruction set is pre-labeled with actual intents in a proportion of 3-25%, and the control area air traffic control instruction set is pre-labeled with actual intents in a proportion of 100%;

Performing conversion of word segmentation on the control area air traffic control instructions and the to-be-predicted area air traffic control instructions, thereby obtaining a control area air traffic control instruction word segmentation sequence and a to-be-predicted area air traffic control instruction word segmentation sequence;

Step 2: constructing a fine-tuned BERT language model, wherein the input to the BERT language model is the control area air traffic control instruction word segmentation sequence added a special token;

Step 3: constructing a masked language model based on the BERT, wherein the input to the masked language model is the to-be-predicted area air traffic control instruction word segmentation sequence added a special token and then performing random selection and replacement of the segmented words at a preset probability;

Step 4: constructing a language model based on contrastive learning according to a Dropout layer of the BERT language model, wherein the input to the language model based on contrastive learning is the to-be-predicted area air traffic control instruction word segmentation sequence added a special token, wherein the BERT language model randomly discards the neurons at a preset probability of the Dropout layer in the training process to obtain different feature representations of a instruction;

Step 5: performing joint pre-training on the fine-tuned BERT language model, the masked language model, and the language model based on contrastive learning to obtain an overall language model;

Step 6: constructing a classifier, using a C-way K-shot method to obtain small samples from the to-be-predicted area air traffic control instructions that are pre-labeled with actual labels according to intents, and inputting them into the overall language model to extract deep semantic feature representations of the instructions, and obtaining an intent recognition model after training the classifier.

In another embodiment of the present invention, specifically, step 1 comprising: performing Chinese instruction word segmentation by using jieba and English instruction word segmentation according to space characters, and performing conversion of word segmentation on the control area air traffic control instructions and the to-be-predicted area air traffic control instructions, thereby obtaining a control area air traffic control instruction word segmentation sequence and a to-be-predicted area air traffic control instruction word segmentation sequence.

In another embodiment of the present invention, specifically, step 5 comprising:

Step 501: constructing a cross entropy loss function $L_{ce}$ corresponding to the fine-tuned BERT language model, constructing a masked language loss function $L_{MLM}$ corresponding to the masked language model, and constructing a contrastive learning loss function $L_{con}$ corresponding to the language model based on contrastive learning;

Step 502: constructing a total loss function of joint pre-training according to the cross entropy loss function, the masked language loss function and the contrastive learning loss function, wherein the total loss function of joint pre-training is expressed as:

$$L = L_{ce} + \lambda_1 L_{MLM} + \lambda_2 L_{con},$$

wherein $\lambda_1$ and $\lambda_2$ respectively correspond to weight parameters of loss functions of two models, subsequently, taking the minimized total loss of joint pre-training as a target, performing joint pre-training on the fine-tuned BERT language model based on the cross entropy loss function, the masked language model based on the masked language loss function and the language model based on the contrastive learning loss function, thereby obtaining an overall language model, wherein specifically, the masked language loss function is expressed as:

$$L_{MLM} = -\sum_{j'=1}^{N_{Mask}} \log P(m_{j'}^* = m_{j'} \mid C'), m_{j'}, m_{j'}^* \in [m_1, m_2, \ldots, m_{N_{Mask}}]$$

wherein $m_{j'}^*$ represents a predicted masked segmented words, $m_{j'}$ represents masked segmented words in the to-be-predicted area air traffic control instructions. C' represents the rest of segmented words except for the masked segmented words in the to-be-predicted area air traffic control instructions, and $N_{Mask}$ represents the total number of segmented words in the to-be-predicted area air traffic control instructions, wherein the contrastive learning loss function is expressed as follows:

$$L_{con} = -\frac{1}{N_{target}} \sum_{j}^{N_{target}} \log \frac{e^{sim(H_j, H_j')/\tau}}{\sum_{j=1}^{N_{target}} e^{sim(H_j, H_k)/\tau}},$$

wherein $N_{target}$ represents the number of the to-be-predicted area air traffic control instructions, $H_j$ and $H_j'$ are two feature representations respectively output by different Dropout layers after the instruction $x_j$ passes through the BERT language model, $sim(H_j, H_j')$ represents the cosine similarity between the two representations, $H_k$ represents a feature representation of other instructions different from the instruction $x_j$, and $\tau$ represents a temperature parameter.

In another embodiment of the present invention, specifically, in the joint pre-training in step 502, performing pre-training on the fine-tuned BERT language model based on the cross entropy loss function, comprising:

Step 502A-1: adding a special token in front of the control area air traffic control instruction word segmentation sequence to obtain a control area air traffic control instruction in a specific format, inputting the control area air traffic control instruction in a specific format into the BERT language model, and outputting a text feature of the control area air traffic control instruction;

Step 502A-2: calculating an intent probability of the control area air traffic control instructions according to the text feature of the control area air traffic control instructions;

Step 502A-3: constructing a cross entropy loss function according to the intent probability of the control area air traffic control instructions and the actual labels of the control area air traffic control instructions: taking the minimized total loss of pre-training as a target, and updating the parameters of the BERT language model and the calculated parameters of the probability by means of a cross entropy loss training;

Step 502A-4: repeatedly performing steps 502A-1 to 502A-3, and when the total loss function of the pre-training becomes stable, obtaining the fine-tuned BERT language model and the parameters calculated intent probability for constructing an overall language model.

In another embodiment of the present invention, in step 502A-1, the control area air traffic control instruction in a specific format is expressed as:

$$x_i = \{[CLS], t_1, \ldots, t_m, \ldots, t_n\}$$

wherein $x_i$ represents a $i^{th}$ control area air traffic control instruction in a specific format. [CLS] represents a special token, $t_m$ represents a $m^{th}$ segmented word in a $i^{th}$ control area air traffic control instruction in a specific format, and n represents the number of segmented words in a $i^{th}$ control area air traffic control instruction in a specific format after the conversion of word segmentation, wherein the text feature of the control area air traffic control instruction output by the BERT language model is expressed as:

$$H_i = \{h_{[CLS]}, h_1, \ldots, h_m, \ldots, h_n\}.$$

wherein $H_i$ represents a feature representation of a $i^{th}$ control area air traffic control instruction, $h_m$ represents a hidden layer feature of a $m^{th}$ segmented word represented by the feature of a $i^{th}$ control area air traffic control instruction, and the last hidden layer feature $h_{[CLS]}$ of [CLS] is a weighted average of all segmented words, wherein the semantic information of each word in each instruction is merged to represent a semantic feature of the instruction.

In another embodiment of the present invention, specifically, step 6 further comprising:

Randomly selecting C categories from the to-be-predicted area labeled dataset, then randomly selecting K instruction samples from each category, and constructing a support set $S=\{(s_o, y_o)\}_{a=1}^{K}$ by using the C*K instruction samples, wherein each support set includes C*K instruction samples and corresponding intent labels, wherein $s_o$ represents an instruction and $y_o$ represents the actual intent;

Constructing a multi-category logistic regression model as a classifier, training the classifier by using the feature representations extracted through the overall language model by using the support set and continuously optimizing the network parameters, wherein $V(\bullet, \beta)$ is taken as the classifier, the logistic regression weight of C categories is expressed as $\beta=\{\beta_v\}_{1 \leq v \leq C}$, and feature representations of the support set are extracted through the overall language model by using $F(\bullet, \theta)$, wherein the entire prediction process of the classifier is expressed as $\bar{y}_o = V(z_o, \beta) = V(F(s_o, \theta), \beta)$, wherein $F(s_o, \theta)$ is a feature representation extracted by the overall language model of $s_o$.

Compared with the prior art, the present invention has the following advantages:

(1) Compared with the prior art, the deep semantic feature based few-shot intent recognition method for air traffic control instructions takes into account the operational properties of air traffic control: moreover, in the present invention, some intents only have a small number of instruction samples: therefore, the present invention uses one air traffic control instruction set to construct a domain language model and adopts an unsupervised learning method to enhance the mining and representation of deep-level features of controller-pilot communication, thereby further improving the reliability of safety situation awareness and semantic representation;

(2) By using the few-shot learning method, the limitation to the corpus dataset in actual operation is reduced, and the intent recognition model is constructed by using a small amount of labeled information: therefore, the application of the model is significantly widened and the training cost is effectively reduced.

BRIEF DESCRIPTION OF THE DRAWINGS

The drawings are merely for illustrative purpose and are not intended to limit the present invention.

FIG. 1 is a flow chart illustrating the deep semantic feature based few-shot intent recognition method for air traffic control instructions;

DETAILED DESCRIPTION

Figure 2:
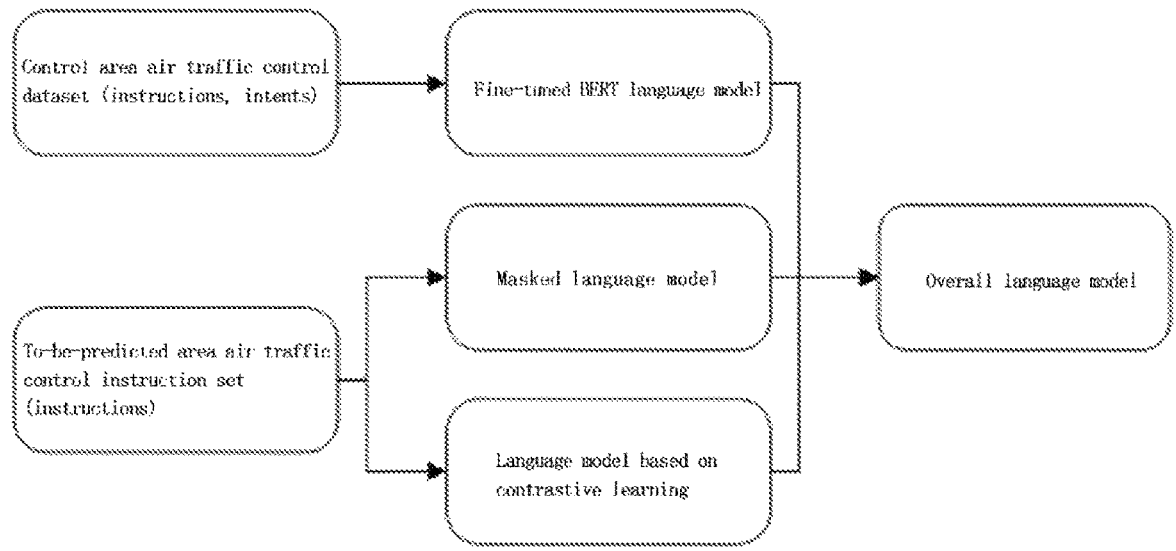
FIG. 2 is a low chart illustrating the joint pre-training performed on the fine-tuned BERT language model, the masked language model and the language model based on contrastive learning.
Figure 3:
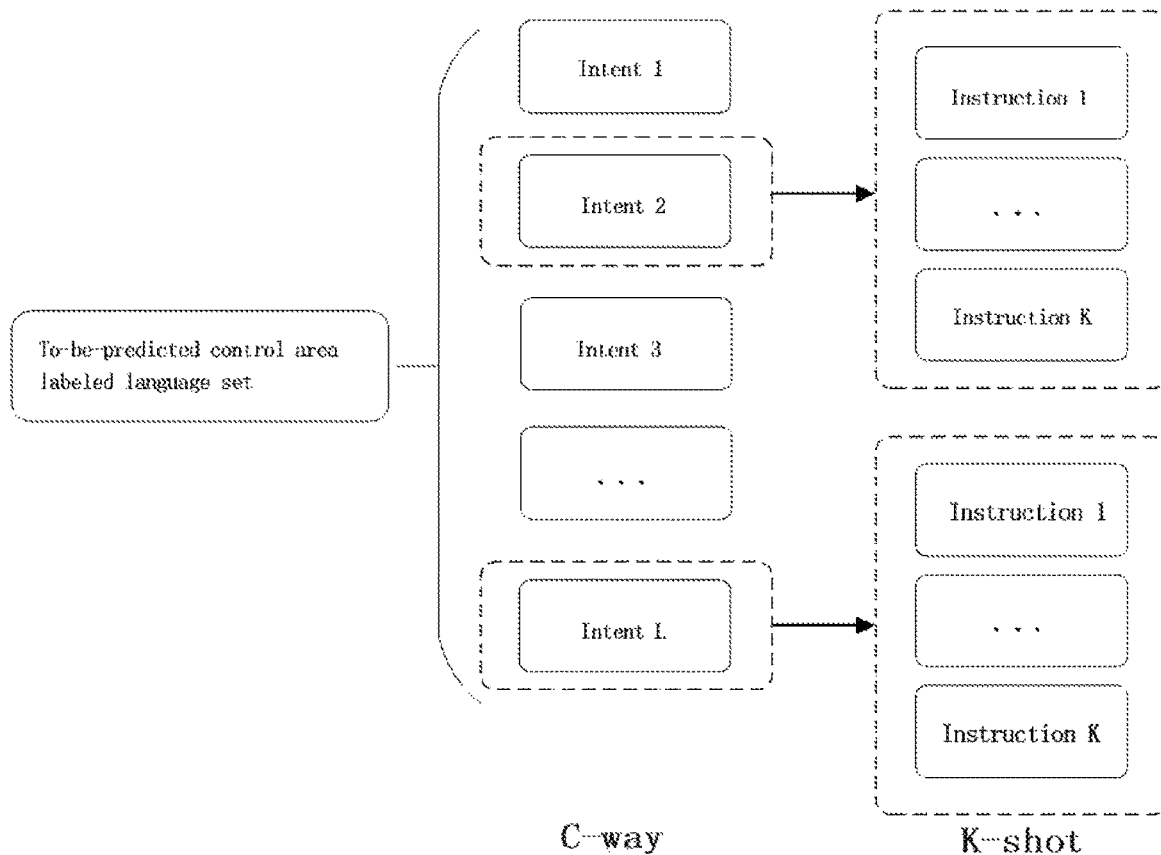
FIG. 3 is a flow chart illustrating the construction of a small sample support set by using the C-way K-shot method.

To allow the purposes, features and benefits of the present invention to be better understood, a detailed description of the present invention is provided below in combination with the drawings and specific embodiments. It should be noted that the embodiments of the present invention and the features in the embodiments may be combined with each other without conflict. In addition, the present invention may also be implemented in other ways different from those described herein. Therefore, the scope of the present invention is not limited by the specific embodiments described below.

The present invention provides a deep semantic feature based few-shot intent recognition method for air traffic control instructions. The method of the present invention comprises the steps of: first, obtaining an overall language model and an intent recognition model as follows:

Constructing a fine-tuned BERT language model, a masked language model and a language model based on contrastive learning, and performing a joint pre-training to obtain an overall language model: constructing a classifier, pre-labeling a part of the to-be-predicted area air traffic control instructions, thereby obtaining small samples therefrom: extracting a deep semantic feature representation through the overall language model, inputting the deep semantic feature representation into the classifier, and performing training on the classifier to obtain an intent recognition model;

Second, using the overall language model and the intent recognition model to recognize the intent of the to-be-predicted area air traffic control instructions that are not pre-labeled;

Inputting the to-be-predicted area air traffic control instructions that are not pre-labeled into the overall language model, and extracting a deep semantic feature representation of the corresponding instructions: subsequently, extracting the deep semantic feature representation of the corresponding instructions, and using the intent recognition model to obtain a corresponding prediction result, thereby completing the intent recognition of the to-be-predicted area air traffic control instructions that are not pre-labeled;

Specifically, obtaining the overall language model and the intent recognition model comprises the steps of:

Step 1: constructing a control area air traffic control instruction set and a to-be-predicted area air traffic control instruction set, wherein the to-be-predicted area air traffic control instruction set is pre-labeled with actual labels according to intents in a proportion of 3-25%, and the control area air traffic control instruction set is pre-labeled with actual labels according to intents in a proportion of 100%;

It should be noted that, the total number of pre-labeled intents to be predicted is relevant to the number of the intent categories: for example, labeling a maximum of 20 instructions for each intent results in a total of 320 instructions for 16 intents: small samples are obtained therefrom for training the model, and the trained model is capable of recognizing the intents of 1000-10000 unlabeled instructions;

The control area air traffic control instruction set is used to construct a domain language model, namely, a source data set, which is expressed as:

$$D_{source}\{(x'_i, y'_i)\}_{i=1}^{N_{source}};$$

wherein $x'_i$ represents a $i^{th}$ air traffic control instruction in a control area air traffic control instruction set, namely, a real controller-pilot vocal communication being converted into a text format, and each text being an instruction of a caller, wherein $y'_i$ represents an intent corresponding to each control area air traffic control instruction, which is labeled and checked by a professional in the industry;

Performing Chinese instruction word segmentation by using jieba and English instruction word segmentation according to space characters, and performing conversion of word segmentation on the control area air traffic control instructions and the to-be-predicted area air traffic control instructions, thereby obtaining a control area air traffic control instruction word segmentation sequence and a to-be-predicted area air traffic control instruction word segmentation sequence;

Step 2: constructing a fine-tuned BERT language model, wherein the input to the BERT language model is the control area air traffic control instruction word segmentation sequence added a special token (see step S502A-1 for details):

Step 3: constructing a masked language model based on the BERT language model, wherein the input to the masked language model is the to-be-predicted area air traffic control instruction word segmentation sequence added a special token and then performing random selection and replacement of the segmented words at a preset probability, wherein the method for adding special words in front of the to-be-predicted area air traffic control instruction word segmentation sequence is the same as the method for adding special words in front of the control area air traffic control instruction word segmentation sequence in step 2;

Randomly selecting and replacing the segmented words at a preset probability; specifically, for example, randomly selecting 15% of the segmented words and masking by using a random mask [Mask] at a probability of 80%; subsequently, replacing using other randomly-selected segmented words at a probability of 10%, and keeping the probability of 10% unchanged;

It is worth mentioning that, the aforesaid probabilities are preset according to actual situations and are therefore not limited. In subsequent joint pre-training, the random mask is capable of allowing the parameters of the model to be continuously optimized, enabling the model to learn new feature representations, and improving the understanding of the model to various instructions in new fields;

Step 4: constructing a language model based on contrastive learning according to a Dropout layer of the BERT language model, wherein the input to the language model based on contrastive learning is a result obtained after special words are added to the to-be-predicted area air traffic control instruction word segmentation sequence, wherein the BERT language model randomly discards the neurons at a preset probability of the Dropout layer in the training process to obtain different feature representations, wherein the method for adding special words in front of the to-be-predicted area air traffic control instruction word segmentation sequence is the same as the method for adding special words in front of the control area air traffic control instruction word segmentation sequence in the step 2;

Due to the different structural features of the to-be-predicted area air traffic control instructions, it is necessary to distinguish not only from the semantic feature of words in the instructions, but also from the semantic feature space at a sentence level. Therefore, the present invention reduces the distance between instructions in the same category and increases the distance between instructions in different categories. In to-be-predicted area air traffic control instructions, each instruction passes through a Dropout layer of the BERT language model, discarding neurons at different positions at a certain probability, thereby generating two different feature representations of one instruction. Here, the to-be-predicted area air traffic control instruction word segmentation sequence added a special token are input into the language model, and the output feature representations H and H' are called a positive pair, and the different feature representation of different instructions are called a negative pair;

In the feature space, the feature spatial distance between instructions in the same category is minimized, and the feature spatial distance between instructions in different categories is increased, allowing instructions having similar sematic feature to be differentiated;

Step 5: performing joint pre-training on the fine-tuned BERT language model, the masked language model, and the language model based on contrastive learning to obtain an overall language model;

Specifically, step 5 further comprising:

Step 501: constructing a cross entropy loss function $L_{ce}$ corresponding to the fine-tuned BERT language model, constructing a masked language loss function $L_{MLM}$ corresponding to the masked language model, and constructing a contrastive learning loss function $L_{con}$ corresponding to the language model based on contrastive learning, wherein specifically, the masked language loss function is expressed as:

$$L_{MLM} = -\sum_{j'=1}^{N_{Mask}} \log P(m_{j'}^* = m_{j'} \mid C'), m_{j'}, m_{j'}^* \in [m_1, m_2, \dots, m_{N_{Mask}}]$$

wherein $m_j^*$ represents a predicted masked segmented words, $m_{j'}$ represents masked segmented words in the to-be-predicted area air traffic control instructions. C' represents the rest of segmented words except for the masked segmented words in the to-be-predicted area air traffic control instructions, and $N_{Mask}$ represents the total number of segmented words in the to-be-predicted area air traffic control instructions, wherein the contrastive learning loss function is expressed as follows:

$$L_{con} = -\frac{1}{N_{target}} \sum_{j}^{N_{target}} \log \frac{e^{sim(H_j, H_j')/\tau}}{\sum_{j=1}^{N_{target}} e^{sim(H_j, H_k)/\tau}},$$

wherein $N_{target}$ represents the number of the to-be-predicted area air traffic control instructions. $H_j$ and $H_j'$ are two feature representations respectively output by different Dropout layers after the instruction $x_j$ passes through the BERT language model. $sim(H_j, H_j')$ represents the cosine similarity between the two representations. $H_k$ represents a feature representation of other instructions different from the instruction $x_j$, and $\tau$ represents a temperature parameter:

Step 502: constructing a total loss function of joint pre-training according to the cross entropy loss function, the masked language loss function and the contrastive learning loss function, wherein the total loss function of joint pre-training is expressed as:

$$L = L_{ce} + \lambda_1 L_{MLM} + \lambda_2 L_{con},$$

wherein $\lambda_1$ and $\lambda_2$ respectively correspond to weight parameters of loss functions of two models, subsequently, taking the minimized total loss of joint pre-training as a joint pre-training target, performing joint pre-training on the fine-tuned BERT language model based on the cross entropy loss function, the masked language model based on the masked language loss function and the language model based on contrastive learning loss function, thereby obtaining an overall language model, wherein specifically, in the joint pre-training in step 502, performing fine-tuning on the BERT language model based on the cross entropy loss function, comprising:

Step 502A-1: adding a special token in front of the control area air traffic control instruction word segmentation sequence to obtain a control area air traffic control instruction in a specific format, inputting the control area air traffic control instruction in a specific format into the BERT language model, and outputting a text feature of the control area air traffic control instruction, wherein the control area air traffic control instruction in a specific format is expressed as:

$$x_i=\{[CLS], t_1, \ldots, t_m, \ldots, t_n\},$$

wherein $x_i$ represents a $i^{th}$ control area air traffic control instruction in a specific format, [CLS] represents a special token, $t_m$ represents a $m^{th}$ segmented word in a $i^{th}$ control area air traffic control instruction in a specific format, and n represents the number of segmented words in a $i^{th}$ control area air traffic control instruction in a specific format after the conversion of word segmentation, wherein the text feature of the control area air traffic control instruction output by the BERT language model is expressed as:

$$H_i=\{h_{[CLS]}, h_1, \ldots, h_m, \ldots, h_n\},$$

wherein $H_i$ represents a feature representation of a $i^{th}$ control area air traffic control instruction, $h_m$ represents a hidden layer feature of a $m^{th}$ segmented word represented by the feature of a $i^{th}$ control area air traffic control instruction, and the last hidden layer feature $h_{[CLS]}$ of [CLS] is a weighted average of all segmented words, wherein the semantic information of each word in each instruction is merged to represent a semantic feature of the instruction:

Step 502A-2: calculating an intent probability of the control area air traffic control instructions according to the text feature of the control area air traffic control instructions: after obtaining the text feature of the control area air traffic control instruction set, connecting a Softmax network layer, and calculating the intent probability $p(y_l|h_{[CLS]})$ corresponding to different instructions based on the text feature of the control area air traffic control instructions:

$$p(y_l|h_{[CLS]})=\text{Soft max}(Wh_{[CLS]}+b), l\in L,$$

wherein $h_{[CLS]}\in R^d$, d represents the dimension of $h_{[CLS]}$, both the weight term $W\in R^{L\cdot d}$ and the bias term b are parameters of a linear layer, and L represents the number of intents:

Step 502A-3: constructing a cross entropy loss function according to the intent probability of the control area air traffic control instructions, the predicted intents and the actual labels of the control area air traffic control instructions: taking the minimized total loss of joint pre-training as a target, and updating the parameters of the BERT language model and the calculated parameters of the intent probability by means of a cross entropy loss training:

$$L_{ce}=-\frac{1}{N}\sum_{i=1}^{N}\sum_{l=1}^{L}y'_l\log(p(y_l|h_{[CLS]}, \theta)),$$

wherein N represents the number of the to-be-predicted area traffic control instruction data, parameter set $\theta=\{\phi, W, b\}$ is continuously updated by means of the cross entropy loss, and $\phi$ is a parameter of the BERT language model:

Step 502A-4: repeatedly performing steps 502A-1 to 502A-3, and when the total loss function becomes stable, obtaining the fine-tuned BERT language model and the parameters calculated intent probability for constructing an overall language model, wherein after the training is completed, the fine-tuned BERT language model is used as the domain language model of the present invention;

Obtaining the best parameters after performing multiple times of training, thereby achieving better representations of the to-be-predicted area air traffic control instructions;

Using a fine-tuned BERT language model constructed by using a control area air traffic control instruction set with sufficient labeled data as the domain language model of the present invention, and combining with the to-be-predicted area air traffic control instruction set, thereby obtaining feature representations of a deep-level overall language model of air traffic control, wherein after the pre-training is completed, the parameters of the overall language model are fixed, and the features of new instructions are represented by sharing the same overall language model parameters;

Step 6: constructing a classifier, using a C-way K-shot method to obtain small samples from the to-be-predicted area air traffic control instructions that are pre-labeled with actual intents, and inputting them into the overall language model to extract deep semantic feature representations of the corresponding instructions for training the classifier while obtaining an intent recognition model;

Specifically, step 6 further comprising:

Taking the dataset composed of the to-be-predicted area air traffic control instructions that are pre-labeled with actual intents as a to-be-predicted area labeled language dataset, randomly selecting C categories from the dataset, then randomly selecting K instruction samples from each category, and constructing a support set $S=\{(s_o, y_o)\}_{o=1}^{K}$ by using the C*K instruction samples, wherein each support set includes C*K instructions and corresponding intent labels, wherein $s_o$ represents an instruction and $y_o$ represents an intent represented by an actual label;

Constructing a multi-category logistic regression model as a classifier, training the classifier by using the feature representations extracted through the overall language model by using the support set, and continuously optimizing the network parameters, wherein $V(\bullet, \beta)$ is taken as the classifier, the logistic regression weight of C categories is expressed as $\beta=\{\beta_v\}_{1\leq v\leq C}$, and feature representations of the support set are extracted through the overall language model by using $F(\bullet, \theta)$ wherein the entire prediction process of the classifier is expressed as $\bar{y}_o=V(z_o,\beta)=V(F(s_o,\theta),\beta)$, wherein $F(s_o,\theta)$ is a feature representation extracted by the overall language model of $s_o$.

Compared with the prior art, the deep semantic feature based few-shot intent recognition method for air traffic control instructions of the present invention takes into account the operational properties of air traffic control. Moreover, in the present invention, some intents only have a small number of instruction samples. Therefore, the present invention uses the one obtained air traffic control instruction set to construct a domain language model and adopts an unsupervised learning method to enhance the mining and representation of deep-level features of controller-pilot communication, thereby further improving the reliability of safety situation awareness and semantic representation. By using the few-shot learning method, the limitation to the corpus dataset in actual operation is reduced, and the intent recognition model is constructed by using a small amount of labeled information. Therefore, the application of the model is significantly widened and the training cost is effectively reduced.

The above are merely preferred embodiments of the present invention, and the scope of the present invention is not limited to the embodiments described above. For those skilled in the art, various improvements and modifications may be made based on the technical solution of the present invention. Therefore, these improvements and modifications shall also fall into the scope defined by the claims of the present invention.

The invention claimed is:

1. The deep semantic feature based few-shot intent recognition method for air traffic control instructions, comprising the steps of:
   first, obtaining an overall language model and an intent recognition model as follows:
   constructing a fine-tuned BERT language model, a masked language model and a language model based on contrastive learning, and performing a joint pre-training to obtain an overall language model; constructing a classifier, pre-labeling a part of the to-be-predicted area air traffic control instructions, thereby obtaining small samples therefrom; extracting a deep semantic feature representation through the overall language model, inputting the deep semantic feature representation into the classifier, and performing training on the classifier to obtain an intent recognition model;
   second, using the overall language model and the intent recognition model to recognize the intent of the to-be-predicted area air traffic control instructions that are not pre-labeled:
   inputting the to-be-predicted area air traffic control instructions that are not pre-labeled into the overall language model, and extracting a deep semantic feature representation of the corresponding instructions; subsequently, performing intent recognition processing on the deep semantic feature representation of the corresponding instructions by using the intent recognition model to obtain a corresponding prediction result, thereby completing the intent recognition of the to-be-predicted area air traffic control instructions that are not pre-labeled.

2. The deep semantic feature based few-shot intent recognition method for air traffic control instructions of claim 1, wherein obtaining the overall language model and the intent recognition model, comprising the steps of:
   step 1: constructing a control area air traffic control instruction set and a to-be-predicted area air traffic control instruction set, wherein the to-be-predicted area air traffic control instruction set is pre-labeled with actual labels according to intents in a proportion of 3-25%, and the control area air traffic control instruction set is pre-labeled with actual labels according to intents in a proportion of 100%;
   respectively performing conversion of word segmentation on the control area air traffic control instructions and the to-be-predicted area air traffic control instructions, thereby obtaining a control area air traffic control instruction word segmentation sequence and a to-be-predicted area air traffic control instruction word segmentation sequence;
   step 2: constructing a fine-tuned BERT language model, wherein the input to the BERT language model is the control area air traffic control instruction word segmentation sequence added a special token;
   step 3: constructing a masked language model based on the BERT language model, wherein the input to the masked language model is the to-be-predicted area air traffic control instruction word segmentation sequence added a special token and then performing random selection and replacement of the segmented words at a preset probability;
   step 4: constructing a language model based on contrastive learning according to a Dropout layer of the BERT language model, wherein the input to the language model based on contrastive learning is a result obtained after special words are added to the to-be-predicted area air traffic control instruction word segmentation sequence, wherein the BERT language model randomly discards the neurons at a preset probability of the Dropout layer in the training process to obtain different feature representations;
   step 5: performing joint pre-training on the fine-tuned BERT language model, the masked language model, and the language model based on contrastive learning to obtain an overall language model;
   step 6: constructing a classifier, using a C-way K-shot method to obtain small pre-labeled with actual labels according to intents, and inputting them into the overall language model to extract deep semantic feature representations of the corresponding instructions for pre-training the classifier while obtaining an intent recognition model.

3. The deep semantic feature based few-shot intent recognition method for air traffic control instructions of claim 2, wherein specifically, step 1 comprising: performing Chinese instruction word segmentation by using jieba and English instruction word segmentation according to space characters, and performing conversion of word segmentation on the control area air traffic control instructions and the to-be-predicted area air traffic control instructions, thereby obtaining a control area air traffic control instruction word segmentation sequence and a to-be-predicted area air traffic control instruction word segmentation sequence.

4. The deep semantic feature based few-shot intent recognition method for air traffic control instructions of claim 3, wherein specifically, step 5 comprising:
   step 501: constructing a cross entropy loss function $L_{ce}$ corresponding to the fine-tuned BERT language model, constructing a masked language loss function $L_{MLM}$ corresponding to the masked language model, and constructing a contrastive learning loss function $L_{con}$ corresponding to the language model based on contrastive learning;
   step 502: constructing a total loss function of joint pre-training according to the cross entropy loss function, the masked language loss function and the contrastive learning loss function, wherein the total loss function of joint pre-training is expressed as:

$$L = L_{ce} + \lambda_1 L_{MLM} + \lambda_2 L_{con},$$

wherein $\lambda_1$ and $\lambda_2$ respectively correspond to weight parameters of loss functions of two models, subsequently, taking the minimized total loss of joint pre-training as a target, performing joint pre-training on the fine-tuned BERT language model based on the cross entropy loss function, the masked language model based on the masked language loss function and the language model based on contrastive learning based on the contrastive learning loss function, thereby obtaining an overall language model.

5. The deep semantic feature based few-shot intent recognition method for air traffic control instructions of claim 4, wherein specifically, the masked language loss function is expressed as:

$$L_{MLM} = - \sum_{j'=1}^{N_{Mask}} \log P(m_{j'}^* = m_{j'} | C'), m_{j'}, m_{j'}^* \in [m_1, m_2, \ldots, m_{N_{Mask}}]$$

wherein $m_{j'}^*$ represents a predicted masked segmented words, $m_{j'}$ represents masked segmented words in the to-be-predicted area air traffic control instructions, $C'$ represents the rest of segmented words except for the masked segmented words in the to-be-predicted area air traffic control instructions, and $N_{Mask}$ represents the total number of segmented words in the to-be-predicted area air traffic control instructions.

6. The deep semantic feature based few-shot intent recognition method for air traffic control instructions of claim 5, wherein the contrastive learning loss function is expressed as follows:

$$L_{con} = -\frac{1}{N_{target}} \sum_{j}^{N_{target}} \log \frac{e^{sim(H_j, H_j')/\tau}}{\sum_{j=1}^{N_{target}} e^{sim(H_j, H_k)/\tau}},$$

wherein $N_{target}$ represents the number of the to-be-predicted area air traffic control instructions, $H_j$ and $H_j^+$ are two feature representations respectively output by different Dropout layers after the instruction $x_j$ passes through the BERT language model, $sim(H_j, H_j^+)$ represents the cosine similarity between the two representations, $H_k$ represents a feature representation of other instructions different from the instruction $x_j$, and $\tau$ represents a temperature parameter.

7. The deep semantic feature based few-shot intent recognition method for air traffic control instructions of claim 6, wherein specifically, in the joint pre-training in step 502, performing pre-training on the fine-tuned BERT language model based on the cross entropy loss function, comprising:
   step 502A-1: adding a special token in front of the control area air traffic control instruction word segmentation sequence to obtain a control area air traffic control instruction in a specific format, inputting the control area air traffic control instruction in a specific format into the BERT language model, and outputting a text feature of the control area air traffic control instruction;
   step 502A-2: calculating an intent probability of the control area air traffic control instructions according to the text feature of the control area air traffic control instructions;
   step 502A-3: constructing a cross entropy loss function according to the intent probability of the control area air traffic control instructions and the actual labels of the control area air traffic control instructions; taking the minimized total loss of pre-training as a target, and updating the parameters of the BERT language model and the calculated parameters of the intent probability by means of a cross entropy loss training;
   step 502A-4: repeatedly performing steps 502A-1 to 502A-3, and when the total loss function of the pre-training becomes stable, obtaining the fine-tuned BERT language model and the parameters calculated intent probability for constructing an overall language model.

8. The deep semantic feature based few-shot intent recognition method for air traffic control instructions of claim 7, wherein in step 502A-1, the control area air traffic control instruction in a specific format is expressed as:

$$x_i = \{[CLS], t_1, \ldots, t_m, \ldots, t_n\},$$

wherein $x_i$ represents a $i^{th}$ control area air traffic control instruction in a specific format, [CLS] represents a special word, $t_m$ represents a $m^{th}$ segmented word in a $i^{th}$ control area air traffic control instruction in a specific format, and n represents the number of segmented words in a $i^{th}$ control area air traffic control instruction in a specific format after the conversion of word segmentation.

9. The deep semantic feature based few-shot intent recognition method for air traffic control instructions of claim 8, wherein the text feature of the control area air traffic control instruction output by the BERT language model is expressed as:

$$H_i = \{h_{[CLS]}, h_1, \ldots, h_m, \ldots, h_n\},$$

wherein $H_i$ represents a feature representation of a $i^{th}$ control area air traffic control instruction, $h_m$ represents a hidden layer feature of a $m^{th}$ segmented word represented by the feature of a $i^{th}$ control area air traffic control instruction, and the last hidden layer feature $h_{[CLS]}$ of [CLS] is a weighted average of all segmented words, wherein the semantic information of each word in each instruction is merged to represent a semantic feature of the instruction.

10. The deep semantic feature based few-shot intent recognition method for air traffic control instructions of claim 9, wherein specifically, step 6 further comprising:
   taking the dataset composed of the to-be-predicted area air traffic control instructions that are pre-labeled with actual intents as a to-be-predicted area labeled language dataset, randomly selecting C categories from the dataset, then randomly selecting K instruction samples from each category, and constructing a support set $S = \{(s_o, y_o)\}_{o=1}^K$ by using the C*K instruction samples, wherein each support set includes C*K instructions and corresponding intent labels, wherein $s_o$ represents an instruction and $y_o$ represents an intent represented by an actual label;
   constructing a multi-category logistic regression model as a classifier, training the classifier by using the feature representations extracted through the overall language model by using the support set, and continuously optimizing the network parameters, wherein $V(\bullet, \beta)$ is taken as the classifier, the logistic regression weight of C categories is expressed as $\beta = \{\beta_v\}_{1 \leq v \leq C}$, and feature representations of the support set are extracted through the overall language model by using $F(\bullet, \theta)$, wherein the entire prediction process of the classifier is expressed as $\bar{y}_o = V(z_o, \beta) = V(F(s_o, \delta), \beta)$, wherein $F(s_o, \theta)$ is a feature representation extracted by the overall language model of $s_o$.

* * * * *